United States Patent
Massoubre

[15] 3,669,932
[45] June 13, 1972

[54] ACCELERATION OF SULFUR VULCANIZATION OF POLYURETHANES

[72] Inventor: Jean-Marie Massoubre, Clermont Ferrand, France

[73] Assignee: Compagnie Generale des Establissements Michelin, raison sociale Michelin & Cie, Clermont Ferrand, France

[22] Filed: Oct. 15, 1970

[21] Appl. No.: 81,155

[30] Foreign Application Priority Data

Oct. 27, 1969 France ..................................6936837

[52] U.S. Cl. ..............260/75 NC, 260/75 NH, 260/77.5 AC, 260/77.5 AM, 260/77.5 MP
[51] Int. Cl. .........................................................C08g 22/34
[58] Field of Search...........260/75 TN, 75 H, 75 P, 77.5 AM, 260/77.5 AC, 77.5 AP, 77.5 M, 75 NC

[56] References Cited

UNITED STATES PATENTS

| 3,043,807 | 7/1962 | Snyder et al. | 260/75 |
| 3,100,759 | 8/1963 | Boussu et al. | 260/77.5 |
| 3,457,326 | 7/1969 | Kienle | 260/858 |
| 3,230,199 | 1/1966 | Muehlhausen et al. | 260/75 |
| 3,219,633 | 11/1965 | Boussu et al. | 260/75 |

*Primary Examiner*—Donald E. Czaja
*Assistant Examiner*—H. S. Cockeram
*Attorney*—Brumbaugh, Graves, Donohue & Raymond

[57] ABSTRACT

The sulfur vulcanization of sulfur-vulcanizable unsaturated polyurethanes can be accelerated by using as an accelerator an organic compound having at least one alkenyl radical attached to a nitrogen atom, the accelerator being attached to the sulfur-vulcanizable polyurethane molecule itself and/or being an ingredient of a sulfur-vulcanizable polyurethane mixture or recipe.

8 Claims, No Drawings

ACCELERATION OF SULFUR VULCANIZATION OF POLYURETHANES

BACKGROUND OF THE INVENTION

The present invention relates to the vulcanizing of polyurethane elastomers and more particularly to their vulcanization by sulfur.

Sulfur-vulcanizable unsaturated polyurethanes, for example, those described in French Pat. Nos. 1,484,729 and 1,486,448, are in general more difficult to vulcanize than the saturated or unsaturated polyurethanes which are vulcanized with peroxides. In order to activate and accelerate the vulcanization by sulfur, metallic accelerators, and particularly complexes of zinc halides and mercaptobenzothiazole sulfides, are used in addition to organic accelerators of the mercaptobenzothiazole type. These metallic accelerators, however, have the drawback that when used in sufficient quantity to cause vulcanization within a relatively short time of not more, for example, than 30 minutes, they have harmful effects on the physical properties of the vulcanized products, decreasing the resistance to aging thereof, particularly in the hot state.

SUMMARY OF THE INVENTION

The present invention relates to the use of compounds which, although producing an acceleration of the vulcanization of the unsaturated polyurethanes by sulfur, do not have the drawback of exerting an unfavorable influence on the physical properties of the vulcanized products or, in any event, the unfavorable effects of which are attenuated.

The method of the invention for accelerating the vulcanization by sulfur of sulfur-vulcanizable unsaturated polyurethanes is characterized by the use, as accelerator, of an organic compound having at least one alkenyl radical attached to a nitrogen atom. By alkenyl radical there is designated a monovalent hydrocarbon radical having at least one ethylene double bond located in the vicinity of the end of the radical. As the simplest examples thereof, mention may be made of the vinyl, allyl, methallyl, propenyl, butenyl-1, butenyl-2 and isobutenyl radicals. A particularly suitable alkenyl radical is the allyl radical $CH_2 = CH — CH_2 —$.

In accordance with a preferred embodiment of the invention, a compound having two or even three alkenyl radicals fixed to the same nitrogen atom are used, which alkenyl radicals may be identical or different.

The invention may furthermore be carried out in two different ways.

In accordance with a first manner of procedure, the N-alkenyl compound is used as one of the ingredients of the mixture or recipe to be vulcanized, and it is physically mixed with other ingredients, namely, polyurethane, carbon black, sulfur, etc., during the preparation of the mixture or recipe.

In accordance with a second manner of procedure, the N-alkenyl compound is chemically united or bonded with the polyurethane molecule itself. For this purpose, one selects an N-alkenyl compound having either one or two functions which are reactive with isocyanates, and particularly one or two alcohol and/or amine functions. Upon the preparation of the polyurethane by reaction of a dihydroxy polymer — for example, a polyester, polyether, polyether amide or polyester ether — and diisocyanate, the associated N-alkenyl compound will chemically unite or bond itself either at the ends of the chain or within the body of the chain of the polyurethane, depending on whether it has one or two functions respectively which are reactive with isocyanates.

Also, one could combine the two manners of operation described above by fixing an N-alkenyl compound in the polyurethane molecule or in one of the constituent components of the polyurethane and by adding an N-alkenyl compound in the polyurethane rubber mixture or recipe to be vulcanized.

The amount of N-alkenyl compound to be used is preferably such that at most two to four nitrogen atoms are used per molecule of polyurethane. If the N-alkenyl compound has only a single ethylene double bond, i.e., an N-monoalkenyl compound, it is preferable that it be limited in use to an amount corresponding to at most two nitrogen atoms per polyurethane molecule. If it has two ethylene double bonds, i.e., an N-dialkenyl compound, one can use more accelerator without preferably exceeding four atoms of nitrogen per molecule of polyurethane. The accelerating effect, as a matter of fact, increases with the proportion of nitrogen atoms but tends to reach a ceiling rather rapidly. On the other hand, the properties of the vulcanized products decrease first of all negligibly and then faster when the proportion of nitrogen atoms is increased. For the preferred proportion of nitrogen atoms, the accelerating effect is substantial, without any appreciable decrease in the properties of the vulcanizates being noted or a decrease which cannot be compensated for by adjusting the proportions of the various ingredients constituting the mixture or recipe to be vulcanized.

By way of examples of N-alkenyl compounds which can be employed, there may be mentioned:

a. as compounds having three alkenyl radicals: triallylamine, N-diallyl-vinylamine, N-diisobutenyl methallylamine, N-dimethyllyl allylamine, divinylamino-1-pentene-4;

b. as compounds having two alkenyl radicals: diallylamine, N-diallyl benzylamine, N-diallyl ethanolamine, N-(diallyl)amino-1-propanediol-2,3, (N-vinyl-N-ethyl)amino-1-butene-3, N,N'-dimethyl-N,N'-divinylethylenediamine, N-dibutenyl-2-ethanolamine, N,N'-diallylethylene diamine and N,N-dimethallylaniline;

c. as compounds having a single alkenyl radical: N-allyl-methylanilne, N-allyl-N- benzylaniline, N-methyl-N-allyl-ethanolamine, N-allyl diethanolamine, vinylamine, methallylamine, ethyl-amino-1-butene-3, amino-1-pentene-4, N-vinyl diethanolamine, N-butenyl-2-dibutylamine, N-vinyl-N-methylaniline, N-allyl N-phenyl benzylamine and N-allyl N-methyl benzylamine.

It would be easy to multiply the examples by replacing the alkenyl radical or radicals in the above compounds by other alkenyl radicals and also modifying the nature of the other radicals attached to the nitrogen atom, whether or not the latter have functions, such as the alcohol function, and whether or not these functions are retained.

A long enumeration of other N-alkenyl compounds would not be necessary to enable one skilled in the art to make and use the present invention. The essential parameters of the N-alkenyl accelerator compound of the invention are: (1) that there be at least one nitrogen atom therein; (2) that there be at least one ethylene double bond therein; and (3) that the nitrogen atom be connected directly or via a small number of intermediate carbon atoms to the ethylene double bond or double bonds. These ethylene unsaturations bound to a nitrogen atom or close to a nitrogen atom have, as a matter of fact, the property of increasing the rate of vulcanization of the polyurethane by the sulfur. It seems that these ethylene unsaturations bound to nitrogen atoms cause a rapid reaction with the sulfur and the customary sulfur organic accelerators to give a very effective sulfuration agent: the sulfur is placed in a very active form and then reacts on the other unsaturations, that is to say, the unsaturations not bound to said nitrogen atoms, present in the polyurethane chains.

Sulfur-vulcanizable unsaturated polyurethanes are elastomers well known to the prior art and hence a detailed description of such elastomers with which the N-alkenyl accelerator compounds of the invention are used need not be set forth herein.

The vulcanizing system to be used in the method of the invention may advantageously comprise, for 100 parts of polyurethane, in addition to the N-alkenyl compound, 1 to 3 parts of sulfur, 1 to 3 parts of mercaptobenzothiazole and 2 to 6 parts of mercaptobenzothiazole sulfide, these proportions being by weight. It may be necessary also to use a small amount of metallic accelerator, for example a zinc halide and mercaptobenzothiazole disulfide complex, possibly associated with cadmium stearate. However, these metallic compounds will be used in an amount of less than 1 part by weight to 100 parts of polyurethane elastomer.

With a vulcanizing system such as described, it is possible to vulcanize a sulfur-vulcanizable unsaturated polyurethane with sulfur within an acceptable period of time, generally less than 30 minutes. Thus at 155° C. the vulcanization time does not exceed 25 minutes; at 135° C. it is still only 45 minutes. Of course, by "vulcanization time" there is understood the time necessary to obtain a vulcanized product having optimum properties: when the vulcanization is followed by with a Monsanto rheometer, this corresponds to a modulus of shear close to 90 percent of its maximum value.

DESCRIPTION OF THE PREFERRED EMBODIMENTS

The present invention will be fully understood by reference to the following embodiments:

In these various examples the following abbreviations will be used:

| | |
|---|---|
| AOP | allyloxypropanediol |
| DAP | diallyloxypropanol |
| MDI | diphenylmethane diisocyanate |
| MBT | mercaptobenzothiazole |
| MBTS | mercaptobenzothiazole disulfide |
| MBZ | mercaptobenzothiazole disulfide/zinc bromide complex |
| SCd | cadmium stearate |
| Mooney Plasticity: | this is the Mooney ML (1+4) plasticity at 100°C. |

EXAMPLE 1

In this example there is used a difunctional N-dialkenyl compound fixed within the polyurethane chain and the vulcanization properties of the polyurethane thus obtained are compared with those of a similar polyurethane not having said compound therewith.

To 10 kg of an unsaturated mixed polyadipate of ethylene glycol, propylene glycol and allyloxypropanediol (AOP) having a molecular weight of 2,740 and having an intermediate ethylenic unsaturation for each 4,700 units of molecular weight there are added:

47.7 g of DAP 96 g of N-(diallyl)amino-1-propanediol-2,3, that is to say, of the compound of the formula:

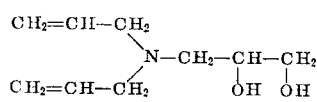

To the mixture brought to 80° C. there are added 1,055 g of MDI. After placing in an oven for 24 hours at 90° C., there is obtained an unsaturated polyurethane having a molecular weight of about 80,000 and a Mooney plasticity of 56. This elastomer in accordance with the invention is designated Polyurethane A.

Similarly, another elastomer in accordance with the invention, designated Polyurethane B, containing one-half less of the difunctional N-dialkenyl compound fixed within the polyurethane chain is prepared from:

10 kg of the same unsaturated mixed polyadipate,
47.7 g of DAP,
47.5 g of N-(diallyl)amino-1-propanediol-2,3,
1,000 g of MDI.

In similar manner, an elastomer of known type, designated Polyurethane C, is prepared as a control from:

10 kg of the same unsaturated mixed polyadipate,
47.2 g of DAP,
945 g of MDI.

Polyurethanes B and C have molecular weights close to 80,000 as does Polyurethane A, and Mooney plasticities which are also close to Polyurethane A.

The three Polyurethanes A, B, C serve to prepare mixtures or recipes the formula of which by weight is given below.

| | A1 | A2 | B1 | B2 | C |
|---|---|---|---|---|---|
| Polyurethane A | 100 | 100 | — | — | — |
| Polyurethane B | — | — | 100 | 100 | — |
| Polyurethane C | — | — | — | — | 100 |
| Stearic acid | 0.3 | 0.3 | 0.3 | 0.3 | 0.3 |
| SAF black | 25 | 25 | 25 | 25 | 25 |
| MBTS | 3.4 | 4.8 | 3.4 | 3.8 | 3.4 |
| MBT | 1.7 | 2.4 | 1.7 | 1.9 | 1.7 |
| MBZ | 0.3 | 0.4 | 0.3 | 0.34 | 0.3 |
| Sulfur | 1.7 | 2.4 | 1.7 | 1.9 | 1.7 |
| SCd | 0.5 | 0.5 | 0.5 | 0.5 | 0.5 |

The vulcanization of the five mixtures was effected at 154° C., its course being followed up with a Monsanto rheometer. The A mixtures reached 90 percent of the final value of the modulus of shear recorded by the apparatus in 19 minutes, the B mixtures in 24 minutes, and the C mixture in 30 minutes.

The vulcanized products have the following properties:

| | A1 | A2 | B1 | B2 | C |
|---|---|---|---|---|---|
| Modulus (at 100% elongation) in kg/cm² | 21.5 | 24.2 | 21.1 | 24.7 | 20.1 |
| ISO hardness | 69 | 70 | 70 | 69 | 68 |
| Hysteresis losses | | | | | |
| at 20°C., % | 33 | 29.4 | 34.4 | 33 | 36 |
| at 60°C., % | 26 | 21.5 | 27.3 | 24.7 | 28.9 |
| Rupture force at 20°C. in kg/cm² | 378 | 374 | 390 | 357 | 383 |

As can be seen, the presence within the polyurethane chain of an N-dialkenyl compound produces a substantial acceleration of the vulcanization, with a slight gain with regard to the physical properties of the vulcanizate, particularly when 4 moles of the N-dialkenyl compound are introduced into each mole of polyurethane (Polyurethane A); the effect is still marked with 2 moles of N-dialkenyl compound in each mole of polyurethane (Polyurethane B). It is advisable to adjust the quantity of vulcanizing system (sulfur and organic accelerators) to take into account the additional double bonds introduced by the N-dialkenyl compound.

It is to be noted that it is not advisable to increase excessively the amount of N-dialkenyl compound fixed within the polyurethane molecule.

If, for instance, within the scope of the present example, the AOP used in the manufacture of the unsaturated mixed polyadipate was replaced by the same molar quantity of N-(diallyl)amino-1-propanediol-2,3, and if a polyurethane was then produced in accordance with the proportions given for the Polyurethane C, one would obtain a Polyurethane D giving, in particular, tacky, vulcanized products having poor physical properties.

Within the scope of the present example, it is Polyurethane A which has the best speed of vulcanization and the vulcanizate thereof has the most advantageous physical properties.

EXAMPLE 2

This example is directed, comparable to the preceding one, to the use of a difunctional N-monoalkenyl compound fixed within the polyurethane molecule. Its purpose is to show the influence of the quantity of N-monoalkenyl versus N-dialkenyl compound used within the polyurethane chain.

From a saturated mixed polydipate of ethylene glycol and propylene glycol having a molecular weight of 2,780, four different Polyurethanes E, F, G and H are prepared as in Example 1 from the following ingredients:

|   | E | F | G | H |
|---|---|---|---|---|
| Polyester | 1000 | 1000 | 1000 | 1000 |
| AOP | 29.3 | 25.3 | 21.5 | 17.5 |
| N-allyl di-ethanolamine | 0 | 4.3 | 8.57 | 12.86 |
| DAP | 5.1 | 5.1 | 5.1 | 5.1 |
| MDI | 144 | 144 | 144 | 144 |

Polyurethane E is a control since it does not contain any N-monoalkenyl compound. Polyurethanes F, G and H of the invention contain two, four or six nitrogen atoms, respectively, per molecule, on the average.

Mixtures or recipes are then prepared from the following formula (by weight):

| Polyurethane E, F, G or H | 100 |
|---|---|
| Stearic acid | 0.3 |
| SAF black | 25 |
| MBTS | 3.4 |
| MBT | 1.7 |
| Sulfur | 1.7 |
| MBZ | 0.6 |

Vulcanization is effected at 154° C., the course of the vulcanization being followed up with a Monsanto rheometer. 90 percent of the maximum value of the modulus of shear is obtained within the following times:

| Mixture E | 25 minutes |
|---|---|
| Mixture F | 18 minutes |
| Mixture G | 15 minutes |
| Mixture H | 12½ minutes |

The vulcanized products have the following properties:

|   | E | F | G | H |
|---|---|---|---|---|
| Modulus (at 100% elongation) kg/cm² | 24.8 | 23.1 | 22.2 | 22 |
| ISO hardness | 74 | 70 | 68 | 67 |
| Hysteresis losses, percent |   |   |   |   |
| at 20°C. | 33.3 | 32.3 | 30.7 | 30.4 |
| at 60°C. | 26 | 24.2 | 24.4 | 25.6 |
| Elongation at rupture, percent | 640 | 670 | 710 | 690 |
| Rupture force, kg/cm² | 379 | 381 | 420 | 417 |
| Goodrich Flexometer: |   |   |   |   |
| Initial compression, percent | 11.6 | 12.7 | 12.9 | 13.8 |
| Heating, °C. | 34.5 | 37 | 43 | 47 |
| Permanent deformation, percent | 2.6 | 6.5 | 15 | >15 |

As can be seen, it is advisable to limit the amount of nitrogen atom content. In the case of the present example, Polyurethane F constitutes the best compromise and there does not seem to be any advantage in using with a difunctional N-monoalkenyl compound more than two nitrogen atoms per molecule of polyurethane. In the preceding Example 1, on the other hand, with a difunctional N-dialkenyl compound, one could advantageously use 4 nitrogen atoms per polyurethane molecule.

EXAMPLE 3

In this example a monofunctional N-dialkenyl compound is fixed to the ends of the polyurethane chain and has for this purpose a single alcohol function.

A polyurethane is prepared as in the preceding examples from:

10 kg of saturated mixed polyadipate of ethylene glycol and propylene glycol having a molecular weight of 2,780
292 g of AOP
41.6 g of N-diallyl ethanolamine, that is to say, the compound of the formula:

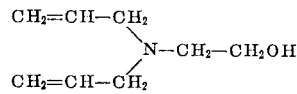

1,446 g of MDI

There is obtained a polyurethane of the invention, designated Polyurethane I, of a molecular weight of 80,000 and a Mooney plasticity of 56.

Under identical conditions there is prepared a control Polyurethane J which is as close as possible structurally to Polyurethane I but does not have any N-dialkenyl compound fixed to the ends of the polyurethane chain but rather has a C-dialkenyl compound fixed to the ends of the polyurethane chain. It being prepared from:

10 kg of the same polyester
292 g of AOP
51 g of DAP
1,440 g of MDI

The molecular weight is also 80,000 and the Mooney plasticity is 60.

With Polyurethanes I and J, mixtures or recipes are prepared using the same formula as in Example 2, and they are vulcanized at 154° C.

Polyurethane I reaches 90 percent of the final modulus of shear at the end of 18 minutes, as compared with 28 minutes in the case of control Polyurethane J. The vulcanized products have the following properties:

|   | I | J |
|---|---|---|
| Modulus (at 100% elongation) kg/cm² | 23.1 | 24.8 |
| ISO hardness | 70 | 74 |
| Hysteresis losses, %, at 20°C. | 30.7 | 33.3 |
| at 60°C. | 23.8 | 26 |
| Elongation at rupture, %, at 20°C. | 667 | 648 |
| Rupture force at 20°C., kg/cm² | 379 | 411 |
| Goodrich Flexometer: |   |   |
| Initial compression | 12.3 | 11.6 |
| Heating, °C. | 36.5 | 31.5 |
| Permanent deformation | 5.2 | 2.6 |

As is seen, the properties of the vulcanized products are very close together, but Polyurethane I of the invention vulcanizes faster; at 134° C. it still requires for vulcanization only 46 minutes as compared with 18 minutes at 154° C.

The vulcanization accelerating effect produced by the N-diallyl ethanolamine is very clear. It makes it possible to reduce the amount of metal accelerator of type MBZ and to use an amount thereof definitely less than half of the amount of sulfur, without any unfavorable effect on the properties. However, there is an optimum level for the amount of MBZ. The Monsanto shear modulus and the optimum vulcanization time vary as follows when reducing the amount of MBZ, but otherwise leaving unchanged the proportions of the other ingredients in the mixture or recipe:

| Amount of MBZ (parts by weight per 100 parts of elastomer) | Optimum vulcanization time (minutes) | Maximum Monsanto modulus |
|---|---|---|
| 0.6 | 18–19 | 94 |
| 0.4 | 22 | 90 |
| 0.2 | 31 | 79 |

It is seen that the amount of MBZ can be reduced to a level corresponding to one-quarter or one-third of the amount of sulfur.

EXAMPLE 4

In this example one proceeds in the same manner as in Example 3 but using another type of N-alkenyl compound, namely, a monofunctional N-monoalkenyl compound, fixed at the ends of the chain.

A Polyurethane K of the invention is produced as above from:

10 kg of a saturated mixed polyadipate of ethylene glycol and propylene glycol having a molecular weight of 2,730
293.5 g of AOP
34 g of N-methyl-N-allyl-ethanolamine, that is to say, the compound of the formula:

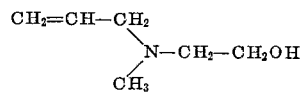

1,460 g of MDI

Under identical conditions, a control Polyurethane L is produced with the same polyester, replacing the monofunctional N-monoalkenyl compound in the above formula by 51 g of DAP, i.e., a monofunctional C-dialkenyl compound.

These polyurethanes which have been previously combined with the same ingredients as in Examples 2 and 3 in accordance with the same formula, are vulcanized. The vulcanization is effected at 154° C. and it is found, by means of a Monsanto rheometer, that 90 percent of the maximum modulus of shear is reached at the end of 22 minutes in the case of Polyurethane K as compared with 28 minutes in the case of control Polyurethane L.

The vulcanized products have the following properties:

|  | K | L |
|---|---|---|
| Modulus (at 100% elongation) kg/cm² | 22 | 24.5 |
| ISO hardness | 68 | 74 |
| Hysteresis losses, %, at 20°C. | 34.7 | 35 |
| at 60°C. | 26.6 | 28 |
| Elongation at rupture at 20°C., % | 697 | 660 |
| Rupture force at 20°C., kg/cm² | 421 | 414 |
| Goodrich Flexometer: |  |  |
| Initial compression | 15.9 | 13 |
| Heating in °C. | 33.5 | 29 |
| Permanent deformation | 10.9 | 3.9 |

The Polyurethane K in accordance with the invention compares less advantageously than in the preceding Example 3 with the control Polyurethane L without terminal N-alkenyl moiety. This is due to the fact that there is used in Polyurethane K a monofunctional N-alkenyl compound containing only a single alkenyl radical fixed to the nitrogen atom instead of two alkenyl radicals fixed to the nitrogen atom as in Polyurethane I of Example 3.

EXAMPLE 5

This example, like Examples 3 and 4, relates to the use of an N-alkenyl compound, namely, a monofunctional N-dialkenyl compound, fixed at the ends of the chain of the polyurethane.

A Polyurethane M of the invention is produced as previously described from:

10 kg of a saturated mixed polyadipate of ethylene glycol and propylene glycol having a molecular weight of 2,730
293.5 g of AOP
29 g of diallylamine, that is to say, the compound of the formula:

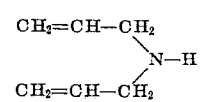

1,470 g of MDI

After homogenization and placing in an oven at 90° C. for 48 hours, there is obtained a polyurethane having a Mooney plasticity of 75.

A control Polyurethane N is obtained by replacing the diallylamine in the above formula by 51 g of DAP, i.e., a monofunctional C-dialkenyl compound.

The two polyurethanes are used in mixtures or recipes of the same formula as in Examples 2 to 4, which mixtures are then vulcanized at 154° C. It is noted on the Monsanto rheometer that the two mixtures are in the same state of vulcanization (90 percent of the final modulus) at the end of 22 minutes in the case of the mixture made with the Polyurethane M and 28 minutes in the case of the mixture made with the Polyurethane N.

The vulcanized products have the following properties:

|  | M | N |
|---|---|---|
| Modulus (at 100% elongation) kg/cm² | 22.8 | 24.5 |
| ISO hardness | 69 | 74 |
| Hysteresis losses in % at 20°C. | 30.8 | 35 |
| at 60°C. | 23.8 | 28 |
| Elongation at rupture at 20°C. in % | 677 | 660 |
| Rupture force at 20°C. in kg/cm² | 414 | 414 |
| Goodrich Flexometer: |  |  |
| Initial compression | 13.9 | 13 |
| Heating in °C. | 27.5 | 29 |
| Permanent deformation | 2.8 | 3.9 |

As can be noted, the diallylamine contributes — a new fact — a substantial acceleration of the vulcanization without losses in the physical properties as compared with DAP. Here again the vulcanization time depends upon the temperature: at 134° C. only 45 minutes are required, however, instead of 22 minutes at 154° C. In the case of diallylamine, one can also reduce the amount of MBZ used without substantial increase of the vulcanization time, nor appreciable decrease in the physical properties, to a value corresponding to one-fourth or one-third of the amount of sulfur used. When the amount of MBZ is reduced, the Monsanto modulus and the optimum vulcanization time vary as follows:

| Amount of MBZ (parts by weight per 100 parts of elastomer) | Optimum vulcanization time (minutes) | Maximum Monsanto modulus |
|---|---|---|
| 0.6 | 22–24 | 100 |
| 0.4 | 29 | 97 |
| 0.2 | 44 | 84 |

EXAMPLE 6

In this example there is used an N-alkenyl compound, namely, an N-dialkenyl compound free of functional groups reactive with isocyanates, completely independent of the polyurethane, i.e., it is an ingredient of the vulcanizable mixture or recipe rather than a moiety of the polyurethane molecule itself.

Starting from the same sulfur vulcanizable unsaturated polyurethane having a molecular weight of 80,000 and having on the average one intermediate double bond per 4,500 units of molecular weight and made from a mixed polyadipate of ethylene glycol and propylene glycol plus AOP, DAP and MDI, the following mixtures or recipes are prepared (by weight):

|  | O | P | Q |
|---|---|---|---|
| Polyurethane | 100 | 100 | 100 |
| Stearic acid | 0.3 | 0.3 | 0.3 |
| SAF black | 25 | 25 | 25 |
| MBTS | 3.4 | 3.4 | 3.4 |
| MBT | 1.7 | 1.7 | 1.7 |
| MBZ | 0.6 | 0.6 | 0.6 |
| Sulfur | 1.7 | 1.7 | 1.7 |
| N-diallyl benzylamine | 0 | 0.5 | 1.0 |

Mixture P of the invention contains an amount of N-alkenyl compound corresponding to approximately 2.1 atoms of nitrogen per molecule of polyurethane.

These mixtures are vulcanized at 154° C. The curing times which make it possible to reach 90 percent of the maximum shear modulus are 25, 14 and 12 minutes, respectively.

The vulcanized products have the following properties:

|  | O | P | Q |
|---|---|---|---|
| Modulus (at 100% elongation) kg/cm² | 20.8 | 18.8 | 17.4 |
| ISO hardness | 68 | 68 | 67 |
| Hysteresis losses in % at 20°C. | 33.9 | 32.5 | 36.1 |
| at 60°C. | 25.5 | 27 | 30.2 |
| Elongation at rupture in % at 20°C. | 713 | 767 | 833 |
| Rupture force at 20°C., kg/cm² | 391 | 424 | 427 |

The vulcanized Polyurethanes O (a control) and P have substantially identical physical properties and yet mixture P was vulcanized in an appreciably shorter period of time. Vulcanized Polyurethane Q, on the other hand, has poorer physical properties due to the higher nitrogen atom content. One can further improve the physical properties of the vulcanized products by modifying the vulcanizing system. Thus by using the system MBTS = 3.1, MBT = 1.9, MBZ = 0.6 and sulfur = 1.9, the maximum shear modulus indicated by the Monsanto rheometer varies as follows as a function of the N-diallyl benzylamine content:

| N-diallyl benzylamine | 0 | 0.2 | 0.5 |
|---|---|---|---|
| Monsanto modulus | 94 | 95 | 98.5 |

EXAMPLE 7

This example illustrates two variants of Example 6 using other N-alkenyl compounds, namely, N-monoalkenyl compounds free of functional groups reactive with isocyanates, also not incorporated in the polyurethane chain but rather present in the elastomer mixture or recipe.

From one and the same unsaturated polyester urethane of a molecular weight of 80,000 having on the average one intermediate ethylenic double bond for every 5,000 units of molecular weight there are prepared mixtures or recipes identical to mixtures O, P and Q of Example 6 except that instead of N-diallyl benzylamine, other N-alkenyl compounds are used in different amount.

Thus N-allyl N-phenyl benzylamine was used in a proportion of 0.6 percent and 1.2 percent and N-allyl N-methyl benzylamine was used in a proportion of 0.4 percent and 0.8 percent.

The following table gives the vulcanization time and the Monsanto modulus in the different cases:

| R | S | | T | |
|---|---|---|---|---|
| Control | N-allyl-N-phenyl benzylamine | | N-allyl N-methyl benzylamine | |
|  | 0.6% | 1.2% | 0.4% | 0.8% |
| Vulcanization time (minutes) at 154°C. | 23 | 14 | 12 | 13 | 11 |
| Monsanto modulus | 94 | 95 | 90 | 99 | 87 |

There is noted a definite acceleration of the vulcanization without excessive reduction of the physical properties of the vulcanized products if the amount of the N-alkenyl product used is limited.

What is claimed is:

1. A method of accelerating the vulcanization by sulfur of a sulfur-vulcanizable unsaturated polyurethane elastomer which comprises physically admixing or chemically uniting the polyurethane with an N-alkenyl accelerator compound having at least one alkenyl radical attached to a nitrogen atom and conducting sulfur-vulcanization thereof, said N-alkenyl accelerator compound being used in an amount sufficient to accelerate the sulfur-vulcanization and up to at most two to four nitrogen atoms per polyurethane molecule.

2. The method as defined by claim 1 wherein the polyurethane and the N-alkenyl accelerator compound are physically admixed prior to vulcanization.

3. The method as defined by claim 1 wherein the polyurethane and the N-alkenyl accelerator compound are chemically united with one another prior to vulcanization.

4. The method as defined by claim 1 wherein the N-alkenyl accelerator compound has at least one allyl radical $CH_2 = CH — CH_2 —$.

5. The method as defined by claim 3 wherein the N-alkenyl accelerator compound has at least one alkenyl radical attached to a nitrogen atom and has two functional groups reactive with isocyanates so as to be chemically united within the chain of the polyurethane molecule.

6. The method as defined by claim 3 wherein the N-alkenyl accelerator compound has at least one alkenyl radical attached to a nitrogen atom and has one functional group reactive with isocyanates so as to be chemically united at the ends of the chain of the polyurethane molecule.

7. The method as defined by claim 1 wherein the sulfur-vulcanization is conducted at a temperature of about 154° C. for at most about 25 minutes.

8. A sulfur-vulcanizable unsaturated polyurethane elastomer having chemically bonded within its molecular chain an N-alkenyl accelerator unit having at least one alkenyl radical attached to a nitrogen atom and having two functional groups reactive with isocyanates, said N-alkenyl accelerator unit being present in an amount sufficient to accelerate sulfur-vulcanization of the elastomer and up to at most two to four nitrogen atoms per polyurethane molecule.

* * * * *